United States Patent
Matsumoto et al.

(10) Patent No.: US 8,068,242 B2
(45) Date of Patent: Nov. 29, 2011

(54) FACSIMILE APPARATUS AND METHOD OF CONTROLLING FACSIMILE APPARATUS

(75) Inventors: Masayuki Matsumoto, Kitakyusyu (JP); Takafumi Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 947 days.

(21) Appl. No.: 12/072,398

(22) Filed: Feb. 26, 2008

(65) Prior Publication Data

US 2008/0204813 A1    Aug. 28, 2008

(30) Foreign Application Priority Data

Feb. 26, 2007    (JP) ................. 2007-045092

(51) Int. Cl.
*G06F 15/00* (2006.01)
*G06F 3/12* (2006.01)
*G06K 1/00* (2006.01)

(52) U.S. Cl. ...................... 358/1.13; 358/1.15
(58) Field of Classification Search ............ 358/1.13, 358/1.15, 401, 501, 426.05
See application file for complete search history.

(56) References Cited

U.S. PATENT DOCUMENTS

| 7,303,187 B2 * | 12/2007 | Shiho et al. ............ 271/9.01 |
| 2003/0174355 A1 * | 9/2003 | Suehiro ............ 358/1.15 |

FOREIGN PATENT DOCUMENTS

| JP | 63-178666 | 7/1988 |
| JP | 05-130385 | 5/1993 |
| JP | 2001-69300 | 3/2001 |
| JP | 2003-163798 | 6/2003 |
| JP | 2003-333276 | 11/2003 |

* cited by examiner

*Primary Examiner* — Douglas Tran
(74) *Attorney, Agent, or Firm* — Nutter McClennen & Fish LLP; John J. Penny, V.

(57) ABSTRACT

A facsimile apparatus includes: receiving unit which receives plural types of sheets including facsimile sheets; a printing unit which performs printing on the sheet received in the receiving unit; an operation unit which is operated; a facsimile data receiving unit which receives facsimile data; a reception print controller which allows the printing unit to perform facsimile printing on the basis of the received facsimile data; and a sheet-setting acquiring unit which acquires sheet setting of a type of sheets to be printed, wherein the reception print controller selectively performs reception setting for automatic reception in which the facsimile printing is performed by the printing unit when the facsimile data is received and reception setting for manual reception in which the facsimile printing is performed on the basis of the operation of the operation unit after the facsimile data is received, and the reception print controller performs the reception setting in accordance with the acquired sheet setting.

7 Claims, 5 Drawing Sheets

FACSIMILE APPARATUS AND METHOD OF CONTROLLING FACSIMILE APPARATUS

BACKGROUND

1. Technical Field

The present invention relates to a facsimile apparatus capable of performing facsimile printing on a preset paper sheet and a method of controlling the facsimile apparatus.

2. Related Art

Recently, a printer, a so-called multi-function printer capable of performing a plurality of functions such as a copying function, a facsimile function, and a printing function has been widely used. Since the multi-function printer has the printing function of a normal printer, the multi-function printer is mounted with a sheet tray which can receive various types of sheets such as an A4 regular sheet and an L-size photo sheet.

An apparatus such as the multi-function printer having a facsimile function can perform a plurality of reception setting. In this case, as the reception setting, there are manual reception in which an image of facsimile data is allowed to be printed by performing an operation by a user when the facsimile data is received, and automatic reception in which the printing is performed without the operation of the user when the facsimile data is received.

As the apparatus having the facsimile function, JP-A-5-130385 discloses a technique in which the size of a printing sheet is set in advance and a facsimile reception image is magnified according to a set print size to print the image.

However, if the technique disclosed in JP-A-130385 is applied to the multi-function printer, there may arise a problem that a facsimile document is printed on a sheet such as the L-size photo sheet which is not a facsimile sheet. That is, the sheet tray of the multi-function printer is configured so as to receive various types of sheets. Accordingly, in a case of using the facsimile function which is set to the automatic reception after use of the printing function, for example, there is a probability that facsimile printing is performed on a sheet such as a sheet with a different size or an expensive sheet which are not the facsimile sheet.

SUMMARY

An advantage of some aspects of the invention is that it provides a facsimile apparatus and a method of controlling the facsimile apparatus capable of preventing facsimile printing from being performed on a sheet which is not a facsimile sheet.

According to an aspect of the invention, there is provided a facsimile apparatus including: a receiving unit which receives plural types of sheets including facsimile sheets; a printing unit which performs printing on the sheet received in the receiving unit; an operation unit which is operated; a facsimile data receiving unit which receives facsimile data; a reception print controller which allows the printing unit to perform facsimile printing on the basis of the received facsimile data; and a sheet-setting acquiring unit which acquires sheet setting of a type of sheets to be printed. In the facsimile apparatus, the reception print controller selectively performs reception setting for automatic reception in which the facsimile printing is performed by the printing unit when the facsimile data is received and reception setting for manual reception in which the facsimile printing is performed on the basis of the operation of the operation unit after the facsimile data is received, and the reception print controller performs the reception setting in accordance with the acquired sheet setting.

With such a configuration, when the reception setting is set to the manual reception in accordance with the sheet setting, the operation of the operation unit is required to perform the facsimile printing. Accordingly, a user can confirm the type of sheets placed on the receiving unit before the facsimile printing, in order to prevent the facsimile printing on a sheet which is not the facsimile sheet. For example, if the sheet setting is not set to the facsimile sheet, there is a high probability that the sheet which is not the facsimile sheet is received in the received unit. Accordingly, it is possible to effectively prevent the facsimile printing on the sheet which is not the facsimile sheet by changing the reception setting in accordance with the sheet setting.

In the facsimile apparatus having the above-described configuration, the sheet-setting acquiring unit may acquire the changed sheet setting when the sheet setting is changed on the basis of the operation of the operation unit. In addition, the reception print controller may change the reception setting in accordance with the changed sheet setting.

With such a configuration, the reception setting is changed depending on the change of the sheet setting when the sheet setting is changed. Accordingly, it is possible to effectively prevent the facsimile printing on the sheet which is not the facsimile sheet.

In the facsimile apparatus having the above-described configuration, the sheet-setting acquiring unit may acquire the sheet setting of the received facsimile data when the facsimile data receiving unit receives the facsimile data. In addition, the reception print controller may change the reception setting in accordance with the sheet setting of the acquired facsimile data.

With such a configuration, the reception setting is changed in accordance with the sheet setting of the received facsimile data. Accordingly, it is possible to effectively prevent the facsimile printing on the sheet which is not the facsimile sheet.

The facsimile apparatus having the above-described configuration may further include a printing-job receiving unit which receives a printing job. In the facsimile apparatus, the sheet-setting acquiring unit may acquire the sheet setting of the received printing job when the printing-job receiving unit receives the printing job. In addition, the reception print controller may change the reception setting in accordance with the sheet setting of the acquired printing job.

With such a configuration, the reception setting is changed in accordance with the sheet setting of the received printing job. Accordingly, it is possible to effectively prevent the facsimile printing on the sheet which is not the facsimile sheet.

In the facsimile apparatus having the above-described configuration, the reception print controller may change the reception setting into the manual reception when the acquired sheet setting is not the sheet setting for the facsimile sheet.

With such a configuration, the reception setting is set to the manual reception required to operate the operation unit when the acquired sheet setting is not set to the facsimile sheet. In addition, the user can confirm the type of sheets received in the receiving unit before the facsimile printing in order to effectively prevent the facsimile printing on the sheet which is not the facsimile sheet.

The facsimile apparatus having the above-described configuration may further include a display unit which displays a screen containing an option for validating a control of changing the reception setting in accordance with the sheet setting and an option for invalidating the control of changing the reception setting in accordance with the sheet setting. In the facsimile apparatus, the reception print controller sets the control of changing the reception setting valid or invalid in accordance with the sheet setting on the basis of a selection operation of the options of the operation unit.

With such a configuration, the user can switch the control of changing the reception setting so as to be valid or invalid by operating the operation unit, if necessary. Accordingly, the user can easily use the facsimile apparatus.

According to another aspect of the invention, there is provided a method of controlling a facsimile apparatus including a receiving unit which receives plural types of sheets including facsimile sheets and a printing unit which performs printing on the sheet received in the receiving unit. The method includes: acquiring sheet setting of a type of sheets to be printed; receiving facsimile data; and performing reception setting in accordance with the acquired sheet setting between the reception setting for automatic reception in which facsimile printing is performed by the printing unit and the reception setting for manual reception in which the facsimile printing is performed on the basis of operation of the operation unit when the facsimile data is received.

In this case, the user can confirm the type of sheets received in the receiving unit before the facsimile printing. Accordingly, it is possible to effectively prevent the facsimile printing on the sheet which is not the facsimile sheet.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an embodiment of the invention will be described with reference to the drawings.

Figure 1:
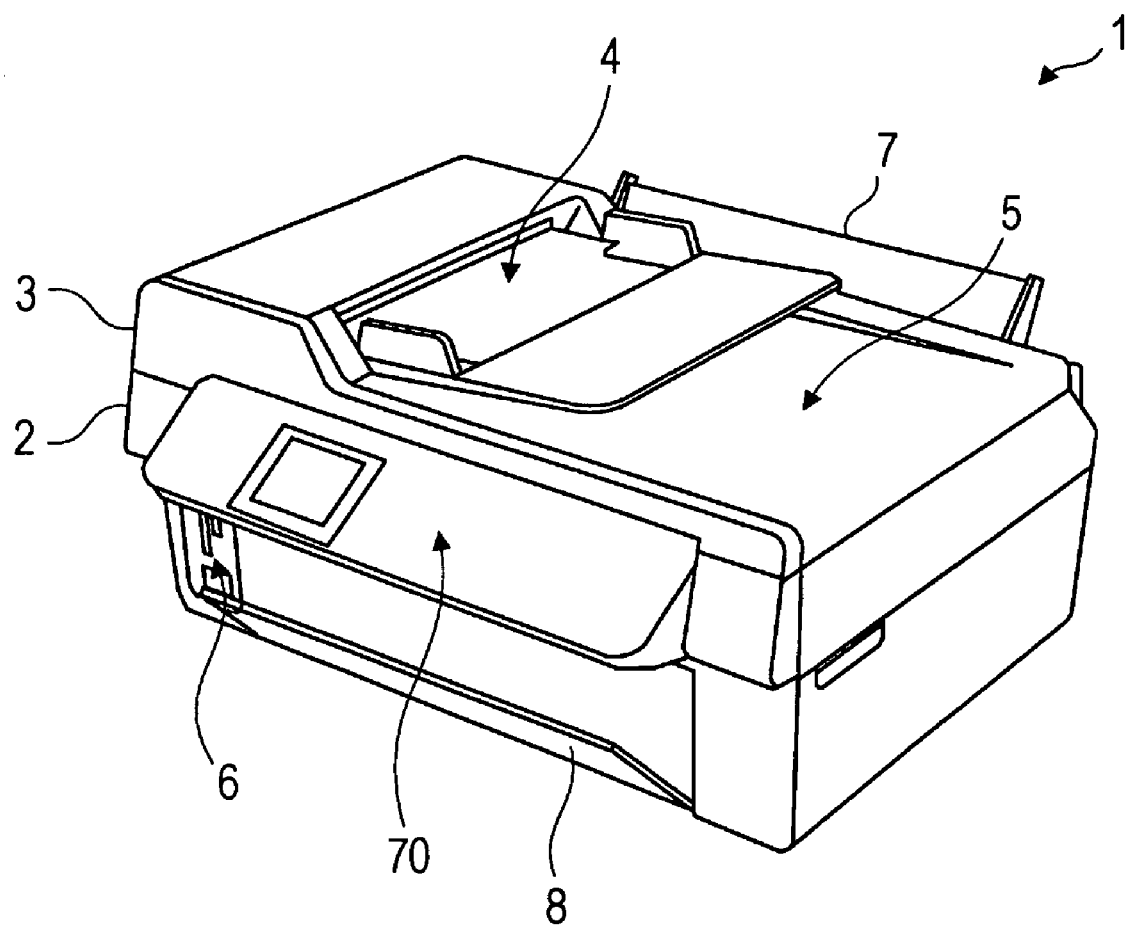
FIG. 1 is a perspective view illustrating an exterior multi-function printer according to an embodiment.

FIG. 1 is a perspective view illustrating an exterior multi-function printer (hereinafter, referred to as "MFP") according to a first embodiment. As a facsimile apparatus, an MFP1 is a so-called complex apparatus which has a copying function of copying a document placed on a document support, a printing function of performing printing on the basis of control of an external instrument such as a host computer or a digital camera, a facsimile function of performing facsimile communication, and a memory card printing function of printing an image stored in a memory card. As shown in FIG. 1, the MFP 1 includes a document cover 3 for covering the document support of an apparatus body 2, a document tray 4 and a document discharging tray 5 attached to the document cover 3, a memory slot 6 for mounting a removable memory such as a memory card, a feeding tray (receiving unit) 7, and a discharging tray 8. The document cover 3 is attached so as to freely open and close the document support of the apparatus body 2 so that a user can sets a document on the document support. The feeding tray 7 can receive plural types of different-size sheets such as an L-size photo sheet and an A4 regular sheet.

An operation unit 70 is mounted on the apparatus body 2 of the MFP1.

Figure 2:
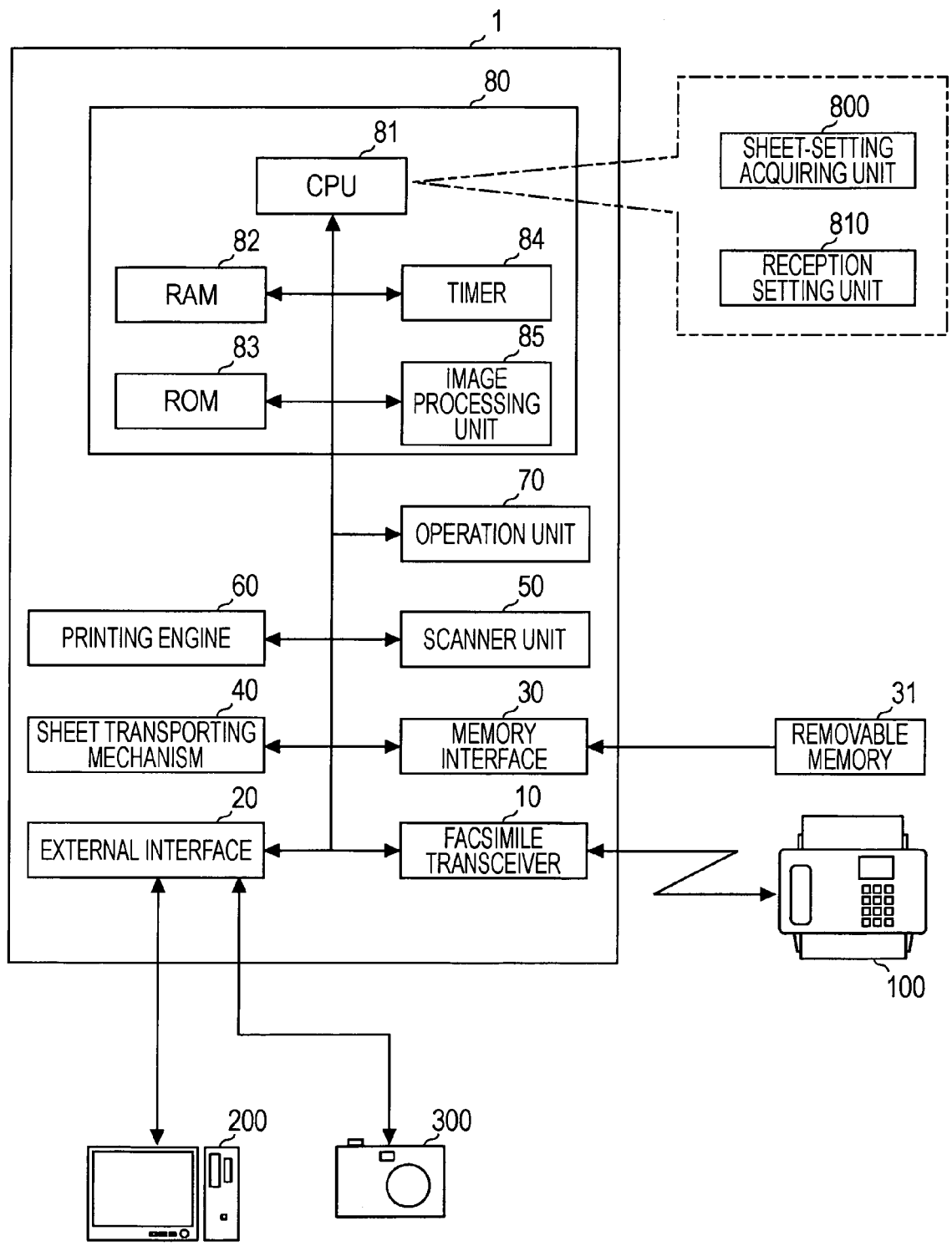
FIG. 2 is a diagram illustrating an inner configuration of the multi-function printer.

Next, the inner configuration of the MFP1 will be described. As shown in FIG. 2, the MFP1 includes a facsimile transceiver (facsimile data receiving unit) 10, an external interface (printing-job receiving unit) 20, a memory interface 30, a sheet transporting mechanism 40, a scanner unit 50, a printing engine (printing unit) 60, the operation unit 70, and a controller 80 for controlling the respective components.

The facsimile transceiver 10 is connected to a different facsimile 100 through a public phone line. The facsimile transceiver 10 has a network control unit (NCU) for connecting a public switched telephone network and a modem function for modulating and demodulating transmission and reception data. The facsimile transceiver 10 detects a ring signal and controls a protocol complied with recommendation of ITU-T to transmit and receive facsimile data to and from the different facsimile 100.

The external interface 20 is an interface for performing communication with an external instrument. As shown in FIG. 2, the external instrument such as a personal computer 200 or a digital camera 300 is connected to the external interface 20.

The memory interface 30 is an interface for a removable memory 31 inserted into the memory slot 6. The removable memory 31 is a nonvolatile storage medium such as a detachable flash memory, and image data as a printing target is stored therein.

The sheet transporting mechanism 40 is a mechanism which transports a sheet in the inside of the MFP1 and includes a plurality of transporting rollers and driving motors. Specifically, the sheet transporting mechanism 40 feeds the sheet received in the document tray 4 into THE MFP1 to transport the fed sheet to the scanning surface of the scanner unit 50 or transports the sheet fed in the feeding tray 7 to supply the sheet to the printing engine 60. Moreover, the sheet transporting mechanism 40 transports the sheet discharged to the document discharging tray 5 after the scanner unit 50 performs scanning, and transports the sheet discharged to the discharging tray 8 after the printing engine 60 performing printing.

The scanner unit 50 is a unit which reads an image of the sheet placed on the document support. In addition, the scanner unit 50 includes an illumination portion such as a fluorescent tube lamp, an image sensor such as CCD or CMOS, analog front end (AFE) for processing an analog signal, and a mechanism for scanning the image sensor along a sheet surface. The illumination portion illuminates the sheet supplied to the scanner unit 50. The image sensor gives reflection light to the sheet to generate an image signal while scanning the sheet along the sheet surface. The generated image signal is subjected to signal amplification, noise removal, and A/D conversion performed by the AFE.

The printing engine 60 is a unit which performs the printing on the sheet supplied by the sheet transporting mechanism 40. The printing engine 60 includes a printing head for forming an image on a printing sheet by use of an ink jet type, an ink cartridge, and a driving circuit for driving the printing head. The printing head and the ink cartridge are provided in a carriage. During the movement of the carriage in a direction perpendicular to a transport direction of the sheet, ink is ejected on the sheet by driving a piezoelectric element provided in the printing head. In this way, the printing is performed by forming dots on the sheet surface. In this embodiment, the printing is performed in the manner of the ink jet type. However, the printing may be performed by use of an electrographic type or a thermal transfer type.

Figure 3:
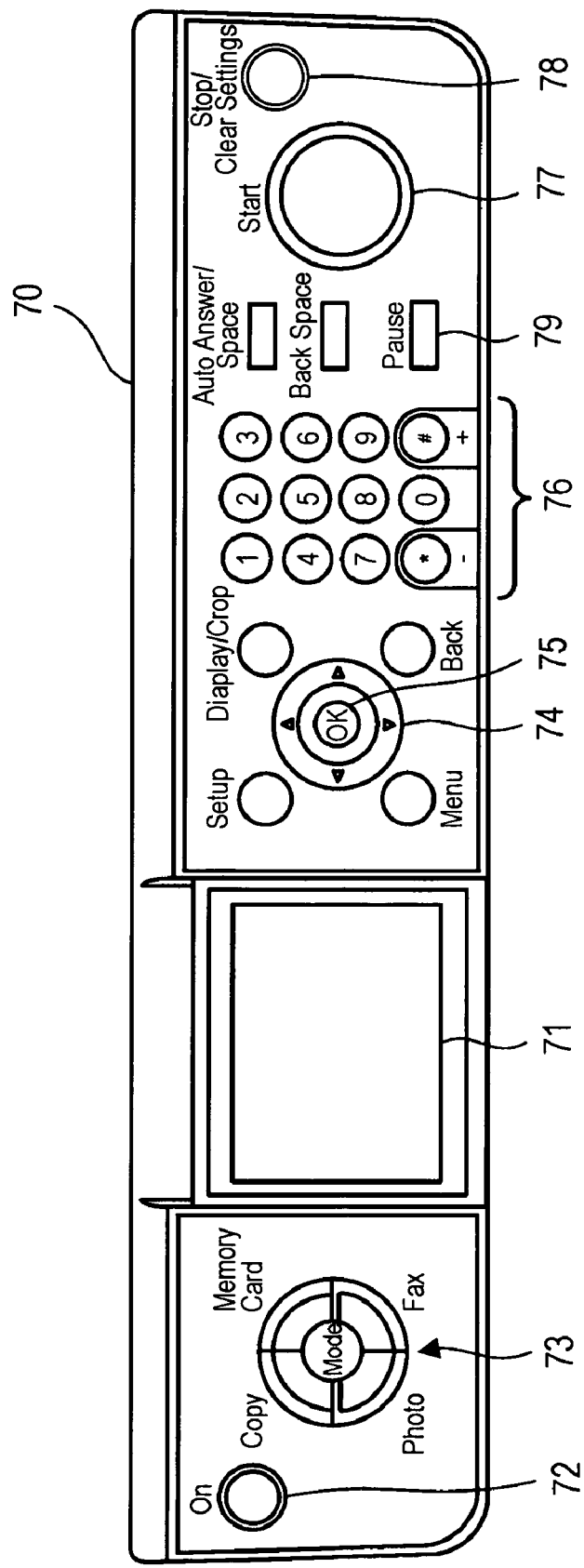
FIG. 3 is an enlarged view illustrating an operation unit.

The operation unit 70 is the user interface for receiving a command of an MFP1 user. FIG. 3 is an enlarged view illustrating the operation unit 70. As shown in FIG. 3, the operation unit 70 includes a display panel 71 such as a liquid crystal display (LCD) and various switches such as a power switch 72, an operation mode selection switch 73, a cursor switch 74, a selection switch 75, a number pad 76, a printing switch 77, a printing stop switch 78, and a pause switch 79.

The operation mode selecting switch 73 is a switch for selecting an operation mode of the MFP1. The operation mode of the MFP1 includes four operation modes such as "a copying mode" for copying the sheet set on the document support, "a printing mode" for printing the image data transmitted from the personal computer 200 and the digital camera 300, "a facsimile mode" for performing the facsimile communication, and "a memory card mode" for printing the image data stored in the removable memory 31 inserted into the memory slot 6. When the user operates the operation mode selection switch 73 to select a desired operation mode, the MFP1 performs the selected operation mode by the control of the controller 80.

The controller 80 controls operations of the MFP1 and includes a CPU 81, a RAM 82, a ROM 83, a timer (clocking unit) 84, and an image processing unit 85. The ROM 83 is a nonvolatile memory such as a flash memory or EEPROM. In addition, a control program is stored in the ROM 83. The RAM 82 is a general memory used as an input and output buffer or a working memory. The CPU 81 is a primary control unit of the MFP1 and controls the operations of the MFP1 by executing the control program stored in the ROM 83.

By executing the control program, the CPU 81 serves as a sheet-setting acquiring unit 800 for acquiring sheet setting and a reception setting unit (reception print controller) 810 for controlling reception setting in accordance with the acquired sheet setting.

The timer 84 includes a crystal oscillator and a counter circuit and performs clocking by counting the number of pulses on the basis of the pulse of a constant period made by the crystal oscillator. The image processing unit 85 is a hardware such as a digital signal processor (DSP) which performs a process for providing an image process such as gamma correction or shading correction of the image data output from the scanner unit 50 or the image process such as resolution conversion, an un-sharp process, gray scale correction, a halftone process, or a division process of the image data output to the printing engine 60 in cooperation with the CPU 81.

The controlling of the controller 80 in the respective operation modes will be simply described. First, copying mode setting will be described. In the copying mode setting, when an instruction of the copy is made as to press the printing switch 77 in a state in which the sheet is placed on the document support, the controller 80 allows the scanner unit 50 to read the sheet placed on the document support. Subsequently, the sheet set in the feeding tray 7 is fed to the sheet transporting mechanism 40, the scanned image data is output to the printing engine 60, and the printing is performed on the fed sheet. The printed sheet is discharged to the discharging tray 8 by the sheet transporting mechanism 40. In this way, the sheet is copied in the copying mode.

In printing mode setting, when a printing job is received from the personal computer 200 or the digital camera 300 through the external interface 20, the controller 80 allows the printing engine 60 to perform the printing on the basis of the received printing job. The printed sheet is discharged to the discharging tray 8 by the sheet transporting mechanism 40. In addition, the printing job may be received by means of wireless communication such as infrared communication between the external interface 20 and a cellular phone. In this way, the printing is performed in the printing mode.

In the memory card mode setting, the controller 80 reads the image data from the removable memory 31 inserted into the memory slot 6 through the memory interface 30 and allows the printing engine 60 to perform the printing. The printed sheet is discharged to the discharging tray 8 by the sheet transporting mechanism 40. In this way, the image stored in the removable memory 31 can be printed.

In the facsimile mode setting, the controller 80 allows the sheet set in the document tray 4 to be fed and the scanner unit 50 to perform the scanning. In addition, the controller 80 allows the facsimile transceiver 10 to transmit the facsimile data of the read image to the facsimile 100 by performing the facsimile communication.

When the facsimile transceiver 10 receives the facsimile data, the controller 80 performs the facsimile mode and transmits the facsimile data to the input buffer of the RAM 82. The controller 80 allows the printing engine 60 to perform the printing on the basis of the received facsimile data and allows the sheet transporting mechanism 40 to discharge the printed sheet to the discharging tray 8. In this way, the facsimile printing is performed.

Figure 4:
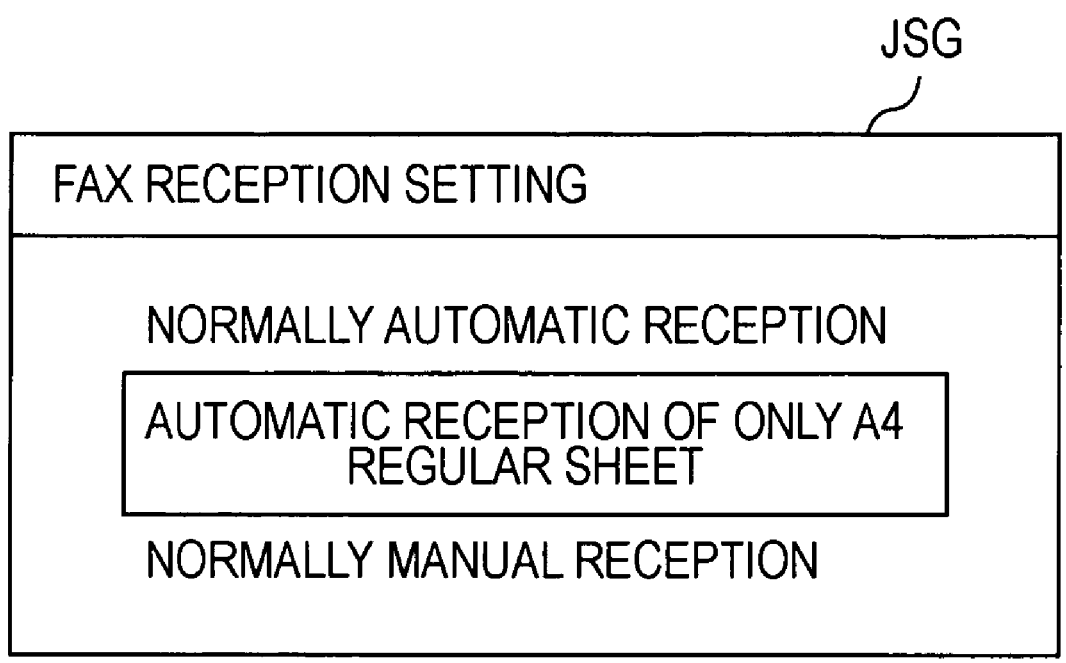
FIG. 4 is a diagram illustrating an example of a reception setting screen.

As for a processing sequence upon receiving the facsimile data, automatic reception setting and manual reception setting can be selected in advance. The reception setting is performed in the manner in which the reception setting unit 810 of the controller 80 displays a reception setting screen JSG shown in FIG. 4 on a display panel 71. Setting of "normally automatic reception", setting of "automatic reception of only an A4 regular sheet", or setting of "normally manual reception" can be selected on the reception setting screen JSG. The user can select a desired reception setting by operating the operation unit 70. In addition, the reception setting unit 810 sets the reception setting by storing information indicating the selected reception setting to a predetermined memory area of the ROM 83.

"The automatic reception of only the A4 regular sheet" is set only when the A4 regular sheet as a facsimile sheet is printed in accordance with a sequence of the automatic reception, and is set when a sheet other which is not the A4 regular sheet is printed in accordance with a sequence of the manual reception. In this embodiment, a case in which the A4 regular sheet is set as the facsimile printing sheet, but the facsimile printing sheet is not limited thereto. In addition, any sheet which the user arbitrarily sets may be set as the facsimile printing sheet by displaying a screen for selecting a sheet treated as the facsimile printing sheet on the display panel 71.

The automatic reception refers to setting of performing facsimile printing without the operation of the user when the facsimile data is received. On the other hand, the manual reception refers to setting of the facsimile printing operation after the user confirms the facsimile data reception by performing a predetermined operation of the operation unit 70 when a receiving sound of an ear portion (not shown) connected to the MFP1 rings.

In a case in which "the automatic reception of only the A4 regular sheet" is set and the external interface 20 receives the printing job, a reception setting change process of changing the reception setting in accordance with the sheet setting is performed when the user operates the operation unit 70 of the MFP1 to change the sheet setting or when the facsimile transceiver 10 receives the ring signal from the public phone line.

Hereinafter, the reception setting change process will be described in accordance with a flowchart.

Figure 5:
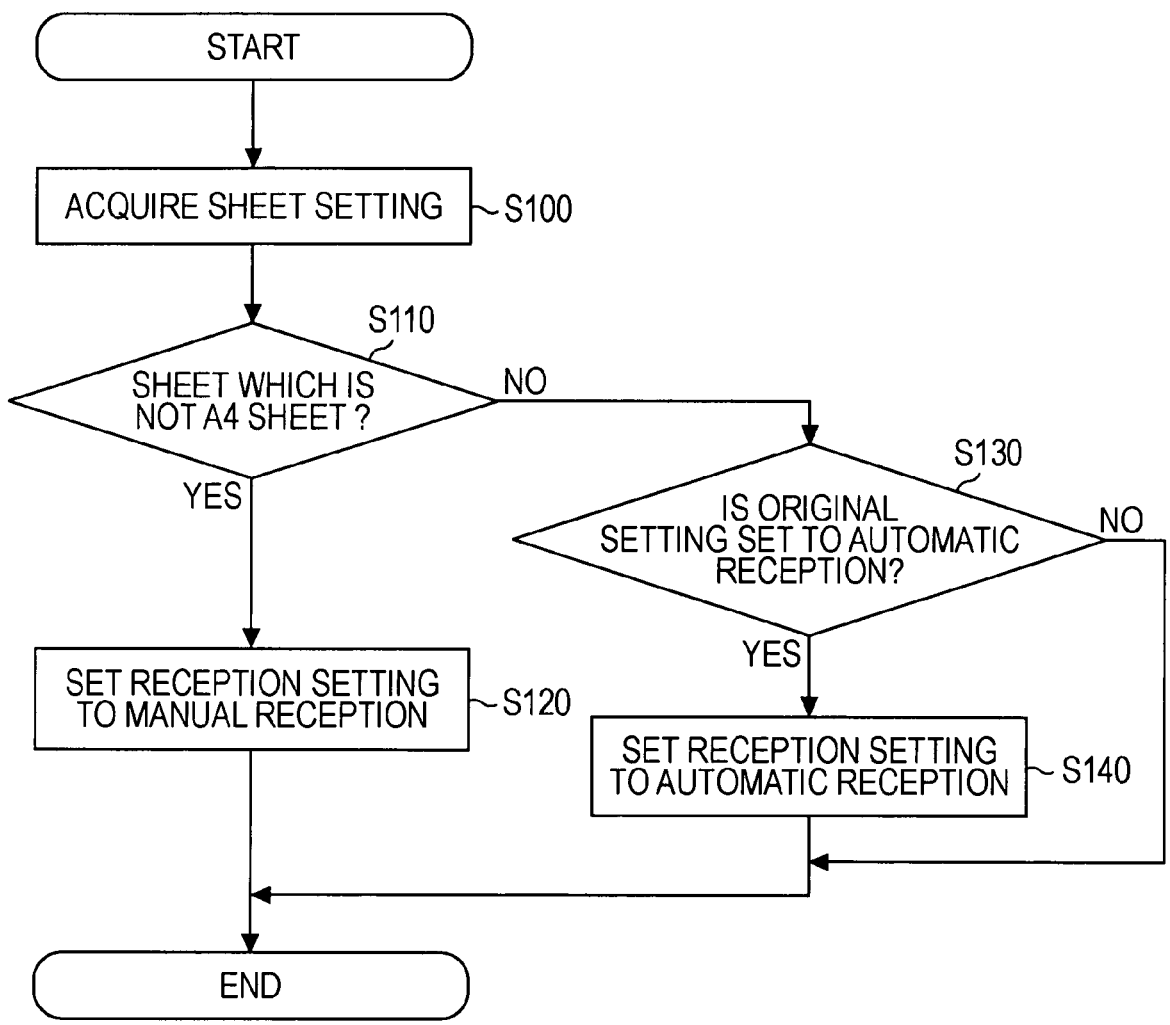
FIG. 5 is a diagram illustrating a flowchart that shows a sequence of changing reception setting.

FIG. 5 is a diagram illustrating the flowchart that shows a sequence of the reception setting change process. When the process of FIG. 5 starts, the CPU 81 first acquires the sheet setting (Step S100). In this case, a method of acquiring the sheet setting is different according to timing at which the reception setting change process starts. Specifically, in a case in which the printing job is received and the reception setting change process starts, the sheet setting of the printing job is acquired. In a case in which the ring signal is received and the reception setting change process starts, the sheet setting designated to the transmitted facsimile data is acquired. In a case in which the sheet setting is changed by the operation of the operation unit 70, the changed sheet setting is acquired.

Next, the CPU 81 determines whether the acquired sheet setting is set to a sheet which is not the A4 regular sheet (Step S110). If the sheet setting is not set to the A4 regular sheet, that is, the facsimile sheet (Yes in S110), the process proceeds to Step S120. Then, the reception setting is set to the manual reception, and the process of FIG. 5 ends.

Alternatively, if the sheet setting is set to the A4 regular sheet (No in Step S110), the process proceeds to Step S130 and the CPU 81 determines whether the original setting, that is, the reception setting before the reception setting change process is the automatic reception. If the original setting is the automatic reception (Yes in Step S130), the reception setting is set to the automatic setting (Step S140), and the process of FIG. 5 ends. Alternatively, if the original setting is the manual reception (No in Step S130), the process of FIG. 5 ends in the state in which the manual reception is set.

In this way, when the sheet which is not the A4 regular sheet is set in a case in which "the automatic reception of only the A4 regular sheet" is set, the reception setting is changed into the manual reception. The process of Step S100 corresponds to a process performed by the sheet-setting acquiring unit 800. The processes of Steps S110 to S140 correspond to a process performed by the reception setting unit 810.

If the sheet setting of the printing job, the sheet setting of the facsimile data, and the sheet setting of the MFP1 are not set to the A4 regular sheet in a state in which "the automatic reception of only the A4 regular sheet" is set, the reception setting is changed into the manual reception. In addition, even though the facsimile data is received, the facsimile printing is not started until the user manually operates the operation unit 70 to instruct start of the printing.

According to the above-described embodiment, the following advantages can be obtained.

(1) When the sheet setting is not set to the A4 regular sheet, there is a high probability that a sheet which is not the facsimile sheet is set in the feeding tray 7. Therefore, a type of sheets received in the receiving unit can be confirmed by changing the reception setting in accordance with the sheet setting before the operation unit 70 is operated to perform the facsimile printing. Accordingly, it is possible to prevent the facsimile printing on the sheet which is not the A4 regular sheet.

(2) If the sheet setting of the received printing job is not set to the A4 regular sheet, the reception setting is changed into the manual reception and the facsimile printing to be performed after the printing on the basis of the printing job is performed in accordance with the sequence of the manual reception. Accordingly, it is possible to effectively prevent the facsimile printing on the sheet which is not the facsimile sheet.

(3) When the sheet sheeting of the MFP1 is set to the sheet which is not the A4 regular sheet, the reception setting is changed into the manual reception and the facsimile printing after the sheet setting is performed in accordance with sequence of the manual reception. Accordingly, it is possible to effectively prevent the facsimile printing on the sheet which is not the facsimile sheet.

(4) when the sheet setting designated to the facsimile data is set to the sheet which is not the A4 regular sheet in a case in which the facsimile transceiver 10 receives the ring signal from the public phone line, the facsimile printing is performed in accordance with the sequence of the manual reception. Accordingly, it is possible to effectively prevent the facsimile printing on the sheet which is not the facsimile sheet.

(5) A user can switch controlling of changing the reception setting into the manual reception so as to be valid or invalid on the reception setting screen JSG when the sheet which is not the A4 regular sheet is set. Accordingly, it is possible to embody the facsimile apparatus which is easily used by the user who performs desired controlling.

The embodiment has been described. However, the invention is not limited thereto, but may be modified in various forms. Hereinafter, modified embodiments of the invention will be described.

(Modified Embodiment 1) The invention may be applied to the MFP1 which includes a plurality of feeding cassettes for receiving different types of sheets and performs printing by selecting a feeding cassette in accordance with the operation of the operation unit 70. In this case, a sheet confirmation screen indicating that the user can conform whether the selection of the feeding cassette is appropriate can be displayed.

(Modified Embodiment 2) In the above-described embodiment, the button of the sheet confirmation screen is selected using the cursor switch 74 and the selection switch 75. However, the button may be selected by pressing the printing switch 77, the printing stop switch 78, and the pause switch 79.

(Modified Embodiment 3) A message for prompting confirmation of the type of the sheet received in the feeding tray 7 may be displayed on the display panel 71 and the user may confirm the type of the set sheet when the facsimile data is received in the manual reception printing.

(Modified Embodiment 4) The invention is not limited to the multi-function printer, but may be applied to a printer having a facsimile or a facsimile function, or a facsimile system including a host computer and a printer.

What is claimed is:

1. A facsimile apparatus comprising:
a receiving unit which receives plural types of sheets including facsimile sheets;
a printing unit which performs printing on the sheet received in the receiving unit;
an operation unit which is operated;
a facsimile data receiving unit which receives facsimile data;
a reception print controller which allows the printing unit to perform facsimile printing on the basis of the received facsimile data; and
a sheet-setting acquiring unit which acquires sheet setting of a type of sheets to be printed,
wherein the reception print controller selectively performs reception setting for automatic reception in which the facsimile printing is performed by the printing unit when the facsimile data is received and reception setting for manual reception in which the facsimile printing is performed on the basis of the operation of the operation unit after the facsimile data is received, and the reception print controller performs the reception setting in accordance with the acquired sheet setting.

2. The facsimile apparatus according to claim 1, wherein the sheet-setting acquiring unit acquires the changed sheet setting when the sheet setting is changed on the basis of the operation of the operation unit, and wherein the reception print controller changes the reception setting in accordance with the changed sheet setting.

3. The facsimile apparatus according to claim 1, wherein the sheet-setting acquiring unit acquires the sheet setting of the received facsimile data when the facsimile data receiving unit receives the facsimile data, and wherein the reception print controller changes the reception setting in accordance with the sheet setting of the acquired facsimile data.

4. The facsimile apparatus according to claim 1, further comprising:

a printing-job receiving unit which receives a printing job, wherein the sheet-setting acquiring unit acquires the sheet setting of the received printing job when the printing-job receiving unit receives the printing job, and wherein the reception print controller changes the reception setting in accordance with the sheet setting of the acquired printing job.

5. The facsimile apparatus according to claim 1, wherein the reception print controller changes the reception setting into the manual reception when the acquired sheet setting is not the sheet setting for the facsimile sheet.

6. The facsimile apparatus according to claim 1, further comprising:

a display unit which displays a screen containing an option for validating a control of changing the reception setting in accordance with the sheet setting and an option for invalidating the control of changing the reception setting in accordance with the sheet setting, wherein the reception print controller sets the control of changing the reception setting valid or invalid in accordance with the sheet setting on the basis of a selection operation of the options of the operation unit.

7. A method of controlling a facsimile apparatus including a receiving unit which receives plural types of sheets including facsimile sheets and a printing unit which performs printing on the sheet received in the receiving unit, the method comprising:

acquiring sheet setting of a type of sheets to be printed;

receiving facsimile data; and performing reception setting in accordance with the acquired sheet setting between the reception setting for automatic reception in which facsimile printing is performed by the printing unit and the reception setting for manual reception in which the facsimile printing is performed on the basis of operation of the operation unit when the facsimile data is received.

* * * * *